United States Patent Office 3,476,784
Patented Nov. 4, 1969

3,476,784
PROCESS FOR PREPARING CARBOXYLIC
ACID THIOANHYDRIDES
Carl C. Greco, Bronx, N.Y., assignor to Stauffer Chemical Company, New York, N.Y., a corporation of Delaware
No Drawing. Filed Jan. 19, 1968, Ser. No. 699,045
Int. Cl. C07c 153/00, 149/00
U.S. Cl. 260—399    11 Claims

ABSTRACT OF THE DISCLOSURE

A process for preparing aliphatic carboxylic acid thioanhydrides of the formula:

$$R-\underset{\underset{O}{\|}}{C}-S-\underset{\underset{O}{\|}}{C}-R$$

wherein the groups represented by R are aliphatic radicals of from 4 to 23 carbon atoms. The process comprises reacting at least one aliphatic acid halide of the formula:

$$R-\underset{\underset{O}{\|}}{C}-X$$

wherein R is as previously defined and X is halogen, with a hydrosulfide of the formula:

MSH wherein M is a Group I metal, Group II metal or ammonium. The reaction is conducted in a two-phase aqueous organic solvent medium, which organic solvent phase is at least partly immiscible with the aqueous phase but substantially miscible with the aliphatic acid halide reactant.

---

This invention relates to organic acid thioanhydrides and, more particularly, to a process for preparing aliphatic carboxylic acid thioanhydrides by the reaction of aliphatic acid halides with a hydrosulfide in a two-phase aqueous-organic solvent system.

Although organic thio acids have been prepared by the reaction of an acid halide with a metal hydrosulfide, the process does not lend itself to the preparation of fatty acid thioanhydrides. When the reaction is conducted in an aqueous reaction medium, the fatty acid halide is hydrolyzed to the acid. When an organic solvent is employed, however, the metal hydrosulfide is not sufficiently soluble.

In accordance with the present invention, it has been found that the aforesaid difficulties and others can be obviated by reacting the aliphatic carboxylic acid halide with a metal hydrosulfide in a two-phase aqueous organic solvent medium, which organic solvent phase is at least partly immiscible with the aqueous phase but substantially miscible with the aliphatic halide reactant. By this method the acid halide is protected from hydrolysis and the thioanhydride product can be easily separated from the metal hydrosulfide contained in the aqueous solvent.

The reaction can be illustrated by the following diagram wherein the groups represented by R are aliphatic hydrocarbon radicals of from 4 to 23 carbon atoms which can be the same or different, and M is a Group I metal, Group II metal or ammonium, and X is a halogen.

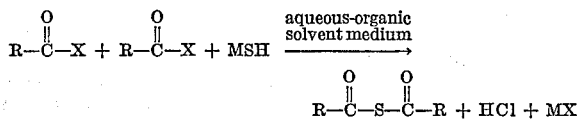

The aliphatic hydrocarbon radicals represented by R can be saturated or unsaturated, branched or unbranched, acyclic or cyclic and can be substituted with any relatively inert radical. Examples of suitable saturated radicals include: butyl, sec-butyl, pentyl, isohexyl, hexyl, heptyl, isocytl, octyl, nonyl, isodecyl, decyl, undecyl, dodecyl, tridecyl, tetradecyl, pentadecyl, hexadecyl, heptadecyl, octadecyl, nondecyl, eicosyl and heneicosyl, cyclohexyl, ethylcyclohexyl, cyclohexylethyl, phenylethyl, 2-ethylhexyl, 2-dimethylpropyl, etc. Examples of suitable unsaturated radicals include: ethenyl, propenyl butenyl, pentenyl, hexenyl, heptenyl, octenyl, nonenyl, decenyl, hexadecenyl and eicosenyl. Examples of relatively inert radicals include aryl groups, alkyl groups, ester or carbalkoxy groups, halogens such as fluorine, chlorine and bromine, as well as cyano, oxy and thioether groups.

Examples of Group I and Group II metal hydrosulfides which can be employed include the hydrosulfides of the metals: sodium, potassium, calcium and magnesium. They can be prepared by the reaction of hydrogen sulfide with the appropriate metal hydroxides.

The two-phase aqueous-organic solvent medium consists of an aqueous phase and an organic solvent in which the acid halide is substantially soluble but which solvent is at least partly immiscible with the aqueous phase. By the use of the two-phase solvent medium, the acid halide reactant is protected from decomposition to the corresponding carboxylic acid.

In a preferred aspect, the hydrogen halide by-product is removed by passing an inert gas through the solution at a vigorous rate sufficient to remove the hydrogen halide by-product. Examples of suitable inert gases include nitrogen, carbon dioxide, carbon monoxide, neon, argon, xenon and the lower alkanes such as methane, ethane, propane and butane or natural gas.

Organic solvents which can be employed include the lower saturated alkanes of from 3 to 20 carbon atoms, halogenated saturated alkanes of from 1 to 10 carbon atoms, aromatic hydrocarbons of from 6 to 20 carbon atoms, and ethers of from 4 to 20 carbon atoms. Examples of suitable alkane solvents include propane, butane, pentane, heptane, hexane, nonane, decane and dodecane. Alicyclics may also be employed such as cyclopropane, cyclobutane, cyclopentane and cyclohexane. Examples of suitable halogenated alkanes which include both chloro- and fluoro-substituted are: ethyl chloride and dichlorodifluoromethane. Examples of suitable aromatic hydrocarbons include benzene, toluene, xylene, mesitylene, ethyl benzene and ethyl toluene. Examples of ethers include diethyl, diisopropyl, dibutyl, anisole, phenetole, and the like.

Acid halides which can be employed in the invention process are the chlorides, bromides and fluorides of substituted and unsubstituted medium chain aliphatic carboxylic acids having from 5 to 24 carbon atoms. For economic reasons the chlorides are, of course, preferred. Representative examples include: isovaleroyl chloride, caproyl chloride, neo-heptanoyl chloride, n-heptanoyl chloride, pelargonic acid chloride, undecylenic acid chloride, ω-bromo-undecanoyl chloride, cinnamoyl chloride, hydrocinnamoyl chloride, lauroyl chloride, palmitoyl chloride, cyclohexyl carboxylic acid chloride, beta-phenoxy propanoyl chloride, stearoyl chloride, tetrachlorostearoyl chloride, α-chlorostearoyl chloride, α-thioethylstearoyl chloride, oleoyl chloride, 9,10-dibromostearoyl chloride behenic acid chloride. Also mixtures of aliphatic acid chlorides and mixtures of substituted acid chlorides can be used, e.g. coconut acid chlorides and tallow acid chlorides. The hydrocarbon moieties R and R can be substituted with any relatively inert radical such as fluorine, chlorine, bromine, or nitro groups. Acetylenic unsaturated carboxylic acid halides can also be employed in the process of the invention, such as, for example, the chlorides of amylpropiolic acid, palmitolic acid, stearolic acid and behenolic acid. The hydrocarbon radicals can also contain ether or thioether linkages.

Dicarboxylic acid halides can also be employed. They can be represented by the formula:

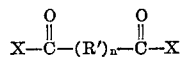

wherein X is as previously defined, R' is a divalent radical of from 1 to 10 carbon atoms, and $n$ is an integer of from 0 to 1. Both aliphatic saturated and unsaturated acid halides can be employed. Examples of suitable saturated compounds include the acid halides of: oxalic, malonic, succinic, glutaric, adipic, pimelic, suberic, azelaic, sebacic and brassic. Examples of suitable unsaturated compounds include the acid halides of fumaric, maleic, glutaconic, allylmalonic, tetrahydrophthallic, tetraconic and xeronic. Mixtures of both saturated and unsaturated mono and dicarboxylic acid halides can be employed if desired. While the dicarboxylic acid thioanhydrides have many uses, they are particularly useful as rubber stabilizers.

Although the proportions of reactants are not critical, they should generally be present in stoichiometric amounts of about 0.5 mole hydrosulfide per mole of acid halide. The quantity of solvent should be sufficient to contain in solution the acid halide so as to prevent hydrolysis to the carboxylic acid. Generally, the ratio of solvent to water will be about 2:1 to about 6:1. The ratio of solvent to water, however, is not critical and may be as low as 1:50 or as great as 50:1.

The temperature of the reaction should be sufficiently high to prevent the reaction mixture from becoming viscous and will generally be from about $-20°$ C. to about $45°$ C. until the intermediate thioacid is formed. The aqueous layer containing the metal halide by-product is then removed and the solvent is heated at a temperature between about $45°$ C. and about $110°$ C. until the reaction is complete. When the reaction is complete, the product can be recovered by the conventional means such as filtration or flash distillation of the solvent, and can be further purified, if desired, by crystallization, distillation and the like.

The following examples will serve to illustrate the process of the invention and its preferred embodiments.

Example 1

To a three-necked one-liter glass reaction flask equipped with a gas inlet tube, dropping funnel, condenser, thermometer and stirrer, was added 100 grams (0.46 mole) of lauroyl chloride dissolved in 100 cc. of benzene. Twenty-four grams (0.23 mole) of 50% aqueous ammonium hydrosulfide was then added by way of the dropping funnel while maintaining the temperature of the reaction mixture at $5°$ C. by means of an ice bath. The exothermic hydrosulfide required one hour, during which time the formation of a white precipitate was noted. The temperature was allowed to rise to $10°$ C. and the reaction mixture was agitated at this temperature for three hours after the addition was complete. The ammonium chloride was removed by filtration and the organic phase separated from the aqueous phase by decantation. The organic solution was then heated to reflux with a vigorous nitrogen purge passing through the solution. The mixture was refluxed for three hours. When the hydrogen chloride evolution was complete, the reaction was terminated. The reaction mixture was filtered, dried over magnesium sulfate and distilled on a flash evaporator. After crystallization from hexane 91.4 grams of thiolauric anhydride was recovered for a yield of 57%.

Example 2

In accordance with the procedure of Example 1, thiostearic anhydride is prepared from stearoyl chloride and sodium hydrosulfide in a pentane aqueous reaction medium.

Example 3

In accordance with the procedure of Example 1, thiopalmitic anhydride is prepared from palmitoyl chloride and calcium hydrosulfide.

Example 4

In accordance with the procedure of Example 1, thiomyristic anhydride is prepared from myristoyl chloride and ammonium hydrosulfide.

The organic thioanhydrides can be employed to protect a number of polymers against degradation and discoloration due to heating. They are particularly effective in stabilizing the halogen containing hydrocarbon polymers such as polyvinyl chloride, and polyvinylidene chloride. The presence of between about 0.01% and about 10% by weight of the stabilizer compound will be sufficient for most applications, although the preferable range is between about 1% and about 5% on a weight basis. The following examples illustrate the employment of the thioanhydrides as stabilizers.

Examples 5–8

The compounds of 1, 2, 3 and 4 (3 grams each) are blended respectively with 100 grams of polyvinyl chloride resin and 30 grams of dioctyl phthalate plasticizer. Each blend is milled at a temperature of $325°$ F. Samples of resin are removed from the hot mill at ten minute intervals and examined. All of the samples are white and clear at the end of 50 minutes milling time.

What is claimed is:

1. A process for preparing aliphatic carboxylic acid thioanhydrides of the formula:

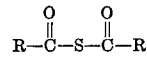

wherein the groups represented by R are aliphatic radicals of from 4 to 23 carbon atoms which comprises reacting at least one aliphatic acid halide of the formula:

wherein R is as previously defined and X is a halogen, with a hydrosulfide of the formula:

MSH wherein M is a Group I metal, Group II metal or ammoninum, wherein the reaction is conducted in a two-phase aqueous organic solvent medium, which organic solvent phase is at least partly immiscible with the aqueous phase but substantially miscible with the aliphatic acid halide reactant.

2. The process of claim 1 wherein the acid halide is lauroyl chloride.

3. The process of claim 1 wherein the acid halide is stearoyl chloride.

4. The process of claim 1 wherein the acid halide is palmitoyl chloride.

5. The process of claim 1 wherein the acid halide is myristoyl chloride.

6. The process of claim 1 wherein the hydrosulfide is ammonium hydrosulfiide.

7. The process of claim 1 wherein the hydrosulfide is sodium hydrosulfide.

8. The process of claim 1 wherein the hydrosulfide is calcium hydrosulfiide.

9. The process of claim 1 wherein the volume ratio of organic solvent phase to aqueous phase is from about 2:1 to about 6:1.

10. The process of claim 1 wherein an inert gas is introduced into the reaction mixture at a rate sufficient to remove the hydrogen halide by-product.

11. The process of claim 1 wherein the volume ratio of organic solvent phase to aqueous phase is from about 1:50 to 50:1.

References Cited

UNITED STATES PATENTS 2,331,650 10/1943 Blake _____ 260—545
2,574,829 11/1951 Himel et al. _____ 260—545

OTHER REFERENCES

Reid: Organic Chemistry of Bivalent Sulfur, vol. IV, 1962, pp. 19, 109 and 126.

DANIEL D. HORWITZ, Primary Examiner

U.S. Cl. X.R.

260—45.7, 545